US012645983B2

(12) United States Patent
Anderson et al.

(10) Patent No.: US 12,645,983 B2
(45) Date of Patent: Jun. 2, 2026

(54) TRAINING A MACHINE LEARNING-BASED TRAFFIC ANALYZER USING A PROTOTYPE DATASET

(71) Applicant: Cisco Technology, Inc., San Jose, CA (US)

(72) Inventors: Blake Harrell Anderson, Chapel Hill, NC (US); David McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 17/386,020

(22) Filed: Jul. 27, 2021

(65) Prior Publication Data

US 2021/0357815 A1 Nov. 18, 2021

Related U.S. Application Data

(63) Continuation of application No. 15/399,081, filed on Jan. 5, 2017, now abandoned.

(51) Int. Cl.
*G06N 20/00* (2019.01)
*H04L 9/40* (2022.01)

(52) U.S. Cl.
CPC ......... *G06N 20/00* (2019.01); *H04L 63/1408* (2013.01); *H04L 63/1425* (2013.01);
(Continued)

(58) Field of Classification Search
CPC ............................ G06N 20/00; H04L 63/1408
See application file for complete search history.

(56) References Cited

U.S. PATENT DOCUMENTS 7,690,037 B1   3/2010   Hartmann
9,350,785 B2   5/2016   Seren et al.
(Continued)

FOREIGN PATENT DOCUMENTS

CN      105389471 A     3/2016
WO    2015167421 A1   11/2015

OTHER PUBLICATIONS

Rajesh et al, "Detecting Malicious Android Applications based on Static Feature Analysis", 2015, Computer Science & Information Technology, pp. 163-178. (Year: 2015).*
(Continued)

*Primary Examiner* — Alexey Shmatov
*Assistant Examiner* — Clint Mullinax
(74) *Attorney, Agent, or Firm* — Lee & Hayes, P.C.

(57) ABSTRACT

In one embodiment, a device in a network generates a feature vector based on traffic flow data regarding one or more traffic flows in the network. The device makes a determination as to whether the generated feature vector is already represented in a training dataset dictionary by one or more feature vectors in the dictionary. The device updates the training dataset dictionary based on the determination by one of: adding the generated feature vector to the dictionary when the generated feature vector is not already represented by one or more feature vectors in the dictionary, or incrementing a count associated with a particular feature vector in the dictionary when the generated feature vector is already represented by the particular feature vector in the dictionary. The device generates a training dataset based on the training dataset dictionary for training a machine learning-based traffic flow analyzer.

20 Claims, 6 Drawing Sheets

(52) U.S. Cl.
     CPC ...... *H04L 63/1441* (2013.01); *H04L 63/0428*
             (2013.01); *H04L 63/1433* (2013.01)

(56)                References Cited

U.S. PATENT DOCUMENTS

| | | | |
|---|---|---|---|
| 9,483,742 | B1 | 11/2016 | Ahmed |
| 9,985,984 | B1 * | 5/2018 | Chavez .................. G06N 20/00 |
| 10,148,680 | B1 | 12/2018 | Segev |
| 10,326,672 | B2 * | 6/2019 | Scheib ............... H04L 43/0858 |
| 2011/0219035 | A1 | 9/2011 | Korsunsky et al. |
| 2012/0240185 | A1 | 9/2012 | Kapoor et al. |
| 2014/0090061 | A1 | 3/2014 | Avasarala et al. |
| 2014/0201126 | A1 * | 7/2014 | Zadeh .................... A61B 5/165 |
| | | | 706/52 |
| 2015/0379430 | A1 | 12/2015 | Dirac et al. |
| 2016/0063372 | A1 * | 3/2016 | Choudhury ............ G06N 3/043 |
| | | | 706/20 |
| 2016/0269424 | A1 | 9/2016 | Chandola et al. |
| 2016/0275414 | A1 | 9/2016 | Towal |
| 2016/0336006 | A1 * | 11/2016 | Levit .................... G10L 15/063 |
| 2020/0067861 | A1 * | 2/2020 | Leddy ................. G06F 21/6245 |

OTHER PUBLICATIONS

Rajesh et al, "Droidswan: Detecting Malicious Android Applications based on Static Feature Analysis", 2015, Computer Science & Information Technology, pp. 163-178. (Year: 2015).*

Rajesh et al, "Droidswan: Detecting Malicious Android Applications based on Static Feature Analysis", 2015, Computer Science and Information Technology, all pages. (Year: 2015).*

European Search Report dated May 24, 2018 in connection with European Application No. 18150071.

Anderson et al., "Deciphering Malware's use of TLS (without Decryption)", arXiv: 1607.01639v1 [cs. CR], 15 pages, Jul. 6, 2016, arXiv:1607.01639v1-cs.CR].

Chung et al., "An Effective Similarity Metric for Application Traffic Classification", 2010 IEEE Network Operations and Management Symposium—NOMS 2010, 7 pages, 2010, IEEE.

Dietterich et al., "Ensemble Learning", The Handbook of Brain Theory and Neural Networks, Second edition, 9 pages, Sep. 4, 2002, The MIT Press.

* cited by examiner

DEVICE 200

MEMORY 240

OPERATING SYSTEM 242

TRAINING DATASET GENERATOR PROCESS 248

TRAFFIC FLOW ANALYZER PROCESS 249

DATA STRUCTURES 245

PROCESSOR(S) 220

NETWORK INTERFACE(S) 210

POWER SUPPLY 260

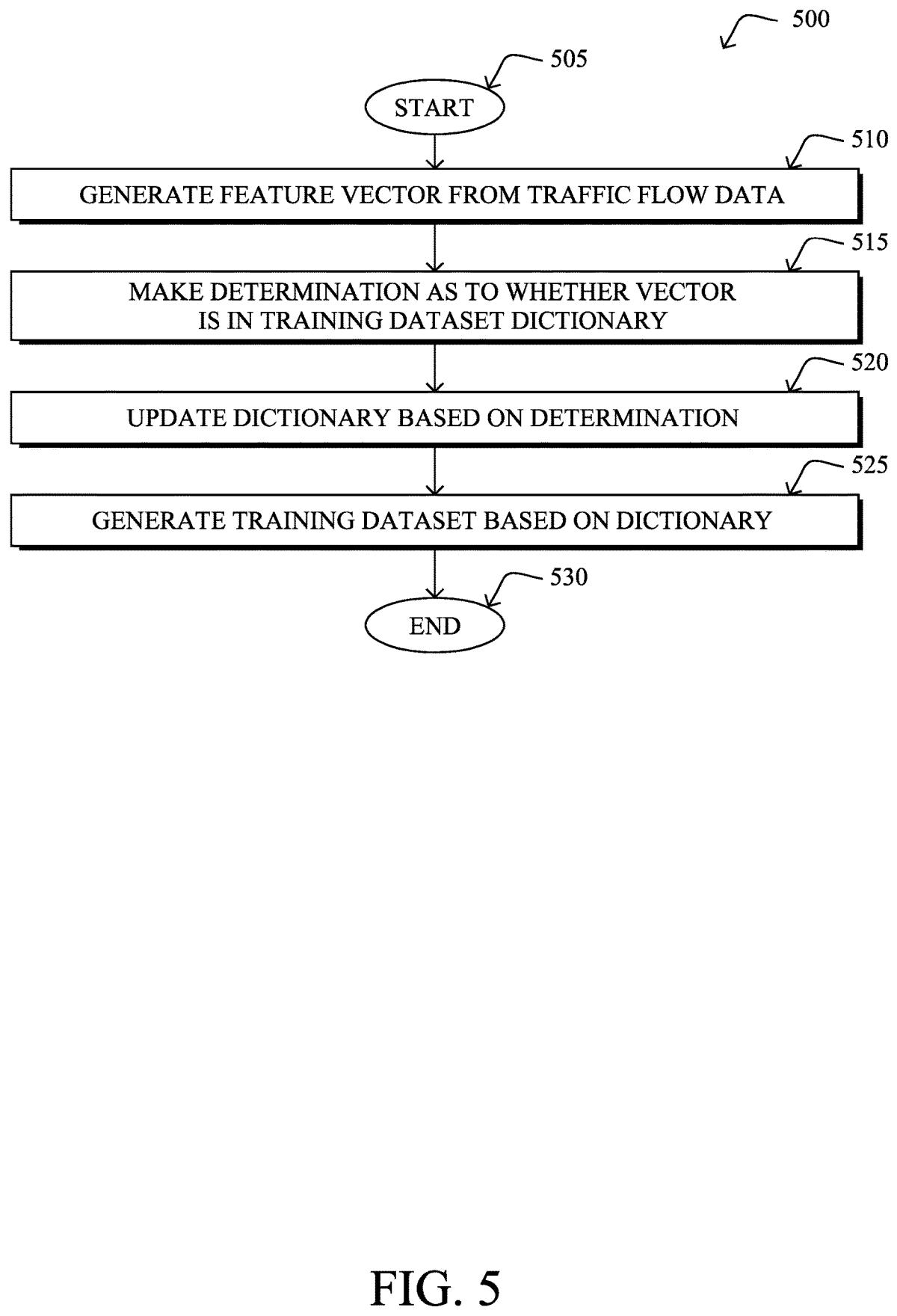

500

505

START

510

GENERATE FEATURE VECTOR FROM TRAFFIC FLOW DATA

515

MAKE DETERMINATION AS TO WHETHER VECTOR
IS IN TRAINING DATASET DICTIONARY

520

UPDATE DICTIONARY BASED ON DETERMINATION

525

GENERATE TRAINING DATASET BASED ON DICTIONARY

530

END

FIG. 5

TRAINING A MACHINE LEARNING-BASED TRAFFIC ANALYZER USING A PROTOTYPE DATASET

RELATED APPLICATION

This application is a continuation of U.S. patent application Ser. No. 15/399,081, filed on Jan. 5, 2017, entitled TRAINING A MACHINE LEARNING-BASED TRAFFIC ANALYZER USING A PROTOTYPE DATASET, by Blake Harrell Anderson, et al., the entire contents of which are incorporated by reference herein.

TECHNICAL FIELD

The present disclosure relates generally to computer networks, and, more particularly, to the training network traffic flow classifiers using a prototype training dataset.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

To further complicate the analysis of network traffic to discern between different types of traffic, the use of encryption is also steadily increasing. Notably, many websites are now using encryption, thereby protecting the payloads of their corresponding traffic from inspection. Malicious entities are also leveraging this fact to conceal malicious traffic using encryption.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example simplified procedure for generating a training dataset for a traffic flow analyzer.

DESCRIPTION OF EXAMPLE EMBODIMENTS

Overview

Figure 1A:
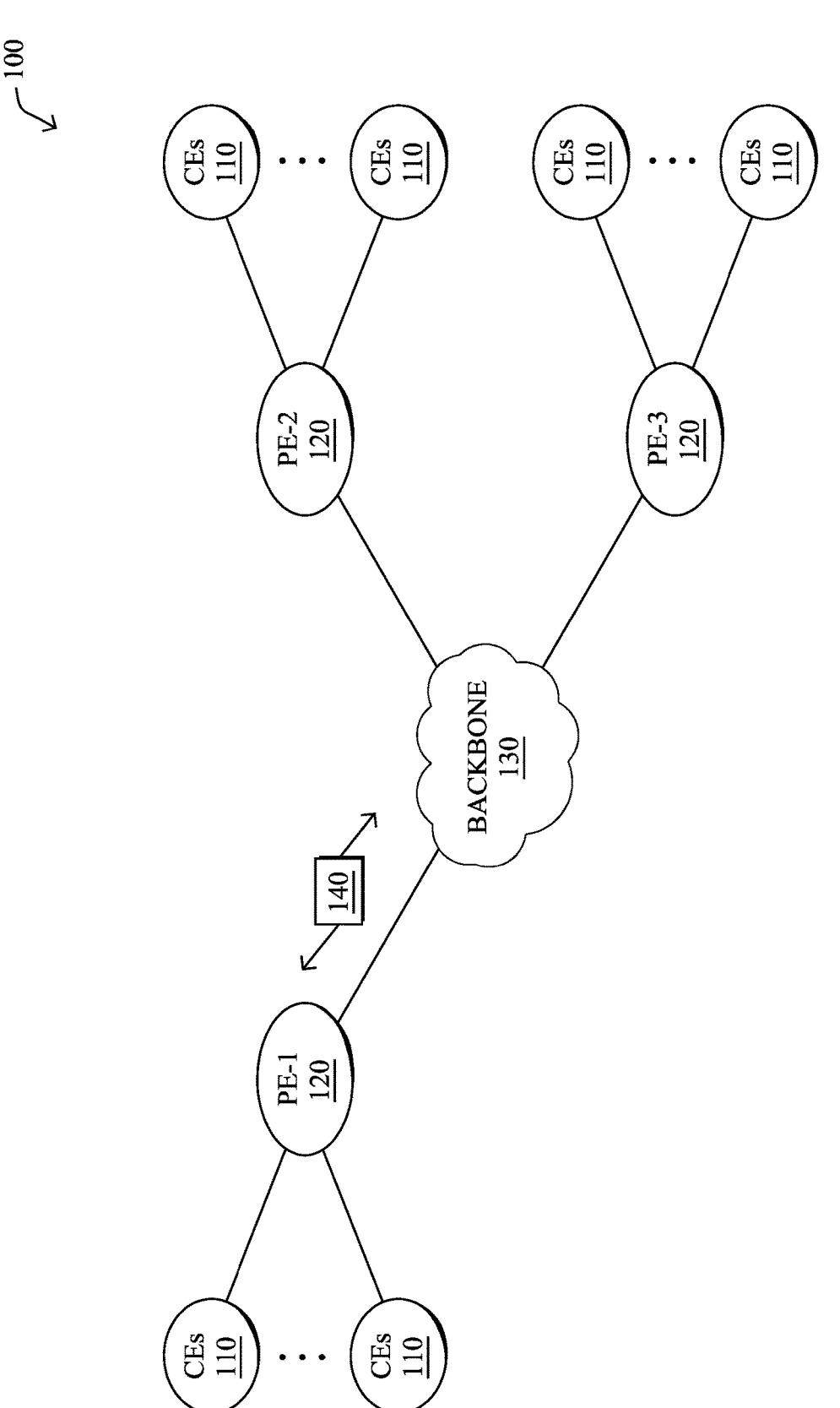
FIGS. 1A-1B illustrate an example communication network.

According to one or more embodiments of the disclosure, a device in a network generates a feature vector based on traffic flow data regarding one or more traffic flows in the network. The device makes a determination as to whether the generated feature vector is already represented in a training dataset dictionary by one or more feature vectors in the dictionary. The device updates the training dataset dictionary based on the determination by one of: adding the generated feature vector to the dictionary when the generated feature vector is not already represented by one or more feature vectors in the dictionary, or incrementing a count associated with a particular feature vector in the dictionary when the generated feature vector is already represented by the particular feature vector in the dictionary. The device generates a training dataset based on the training dataset dictionary for training a machine learning-based traffic flow analyzer.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
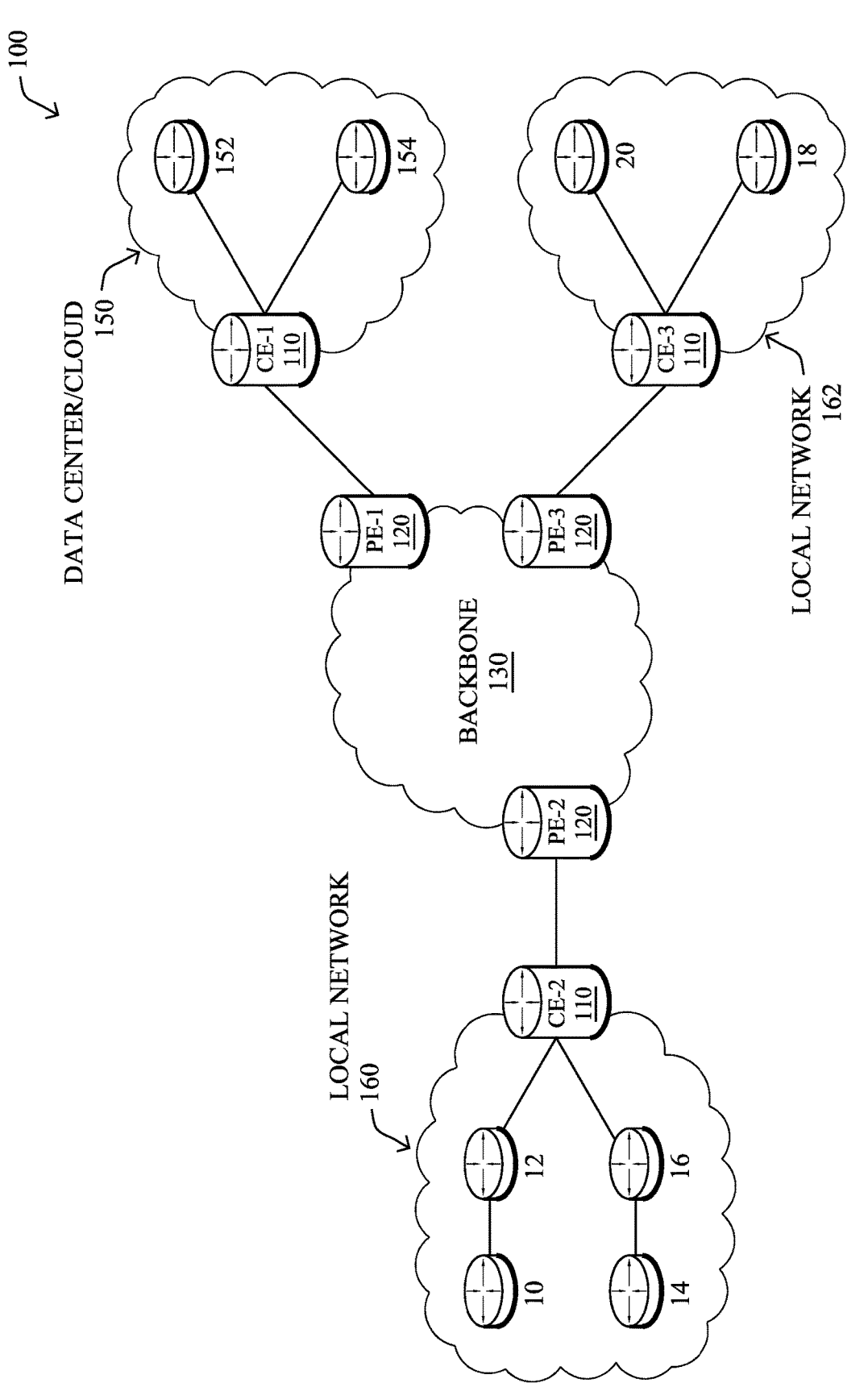

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
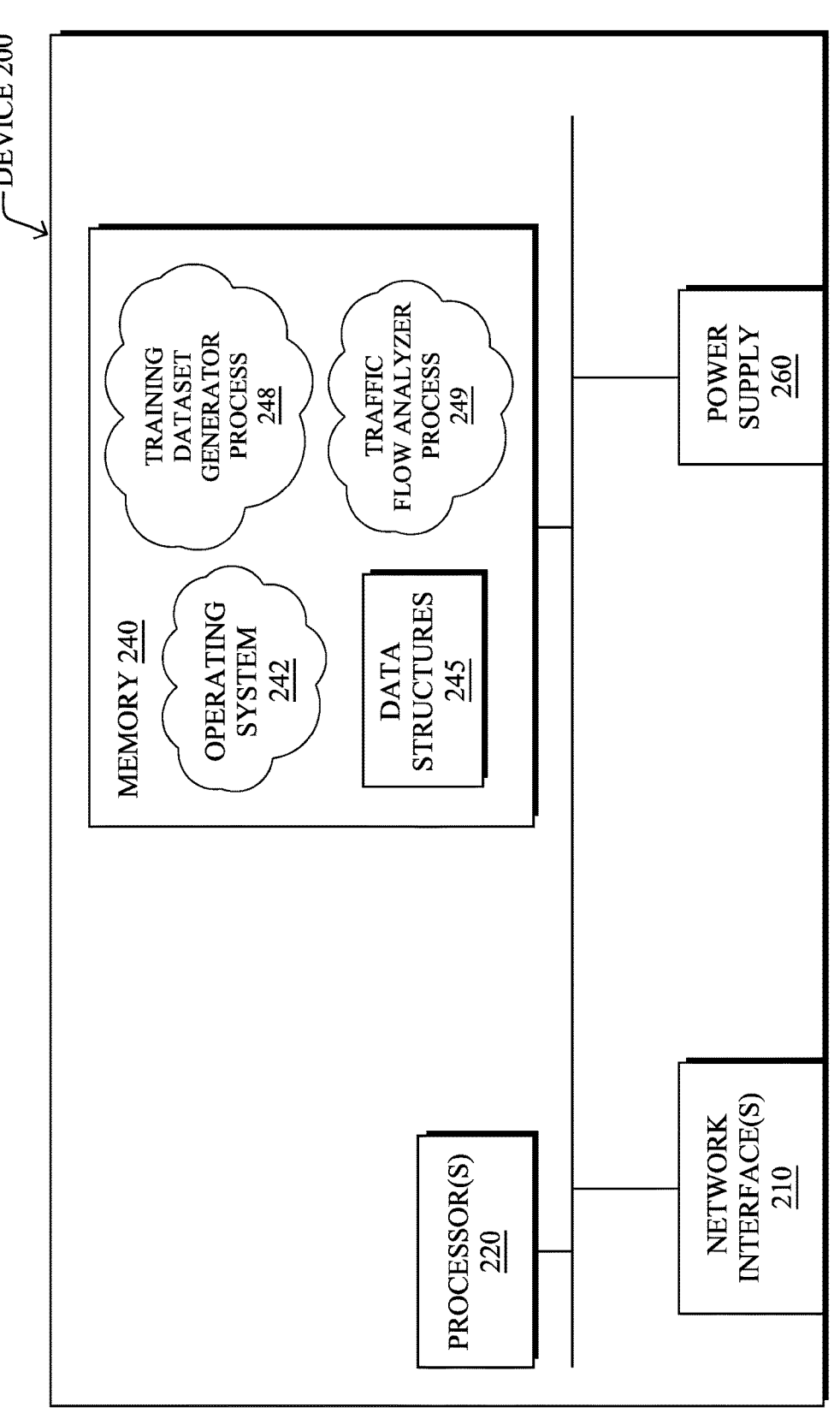
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a training dataset generator process 248 and/or a traffic flow analyzer process 249.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Traffic flow analyzer process 249 includes computer executable instructions that, when executed by processor(s) 220, cause device 200 to analyze available information about a traffic flow to discern the traffic flow type of the flow under analysis. In some embodiments, traffic flow analyzer process 249 may discern between different types of benign traffic flows, such as the various applications associated with the flows. In further embodiments, traffic flow analyzer process 249 may discern between benign and malicious traffic flows and may even identify the specific type of a malicious flow (e.g., the specific family of malware associated with the flow). Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic flow analyzer process 249 may analyze traffic flow data to detect anomalous or otherwise undesirable behaviors (e.g., malfunctioning devices, misconfigured devices, etc.), traffic pattern changes (e.g., a group of hosts begin sending significantly more or less traffic), or the like.

According to various embodiments, traffic flow analyzer process 249 may employ any number of machine learning techniques, to assess a given traffic flow in the network. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic flow analyzer process 249 can use the model M to classify new data points, such as information regarding new traffic flows in the network. Often, M is a statistical model, and the cost function is inversely proportional to the likelihood of M, given the input data.

In various embodiments, traffic flow analyzer process 249 may employ one or more supervised, unsupervised, or semi-supervised machine learning models to analyze traffic flow data. Generally, supervised learning entails the use of a training dataset, such as a training dataset generated by training dataset generator process 248, which is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic flow analyzer process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic flow analyzer process 249 may assess the captured traffic data on a per-flow basis. In other embodiments, traffic flow analyzer process 249 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
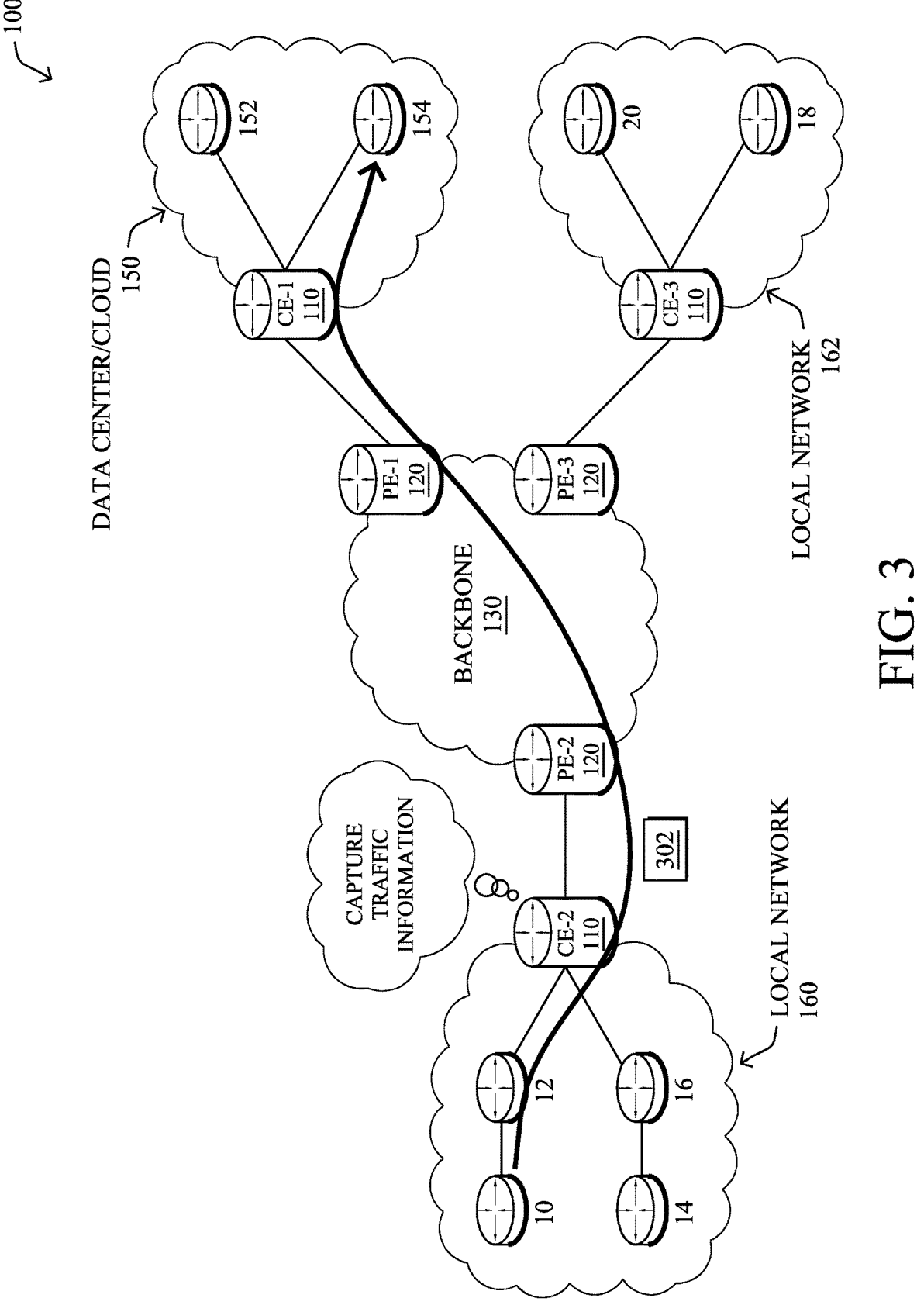
FIG. 3 illustrates an example of the capture of traffic flow data.

As shown in FIG. 3, various mechanisms can be leveraged to capture information about traffic in a network. For example, consider the case in which client node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows. While the packets 302 flow through edge router CE-2, router CE-2 may capture traffic data regarding the flow. Notably, traffic flows can be monitored in many cases through the use of a tap or Switch Port Analyzer (SPAN).

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

In the specific case of encrypted traffic, the networking device that captures the traffic data may also be a proxy device, in some embodiments. For example, CE-2 or another intermediary device may act as a man-in-the-middle between endpoints, to intercept the encryption credentials used and simulate responses from each respective node. In doing so, the device may be able to decrypt and analyze the payloads of the packets. Alternatively, in further embodiments, the device may simply capture header information from encrypted traffic, such as Transport Layer Security (TLS) header information.

As noted above, captured traffic flow data can be used to form a training dataset for a machine learning-based traffic flow analyzer, such as traffic flow analyzer process 249. However, it is often the case that a training dataset based on the full set of captured traffic data is too unwieldy for many systems. Notably, in many cases, the training dataset must be small enough to reside in memory during the training of the machine learning process.

It has also been discovered through preliminary testing that captured traffic flow data is often redundant for purposes of training a machine learning-based traffic analyzer. For example, an experiment was conducted over a four day period and collected traffic flow data regarding approximately 50 million observed flows. However, due to the redundant and/or similar information in the captured traffic flow data, it was discovered that a subset of the traffic flow data for approximately only 150,000 flows sufficiently represents the entirety of the ~50 million flows when generating a training dataset.

Training a Machine Learning-Based Network Traffic Analyzer Using a Prototype Dataset The techniques herein allow for the generation of a "prototype" training dataset for a machine learning-based traffic analyzer by reducing redundancies in the captured traffic flow data used to form the training dataset. Doing so allows for the more efficient training of machine learning processes, creation of more robust traffic analyzers, reduction of storage requirements, and more efficient transport of the datasets via a network. In some aspects, the techniques herein compute a similarity score between a newly observed feature vector and those already stored in a training dataset dictionary, to determine whether or not to add the new feature vector to the dictionary. In further aspects, the techniques may also maintain counts for the feature vectors in the dictionary, to better represent the traffic load in the network. These counts can also be leveraged to generate a training dataset that is adapted for a particular target network (e.g., if a certain type of traffic is not present in the target network, feature vectors for this traffic type can be excluded from the training dataset, etc.).

Specifically, according to one or more embodiments of the disclosure as described in detail below, a device in a network generates a feature vector based on traffic flow data regarding one or more traffic flows in the network. The device makes a determination as to whether the generated feature vector is already represented in a training dataset dictionary by one or more feature vectors in the dictionary. The device updates the training dataset dictionary based on the determination by one of: adding the generated feature vector to the dictionary when the generated feature vector is not already represented by one or more feature vectors in the dictionary, or incrementing a count associated with a particular feature vector in the dictionary when the generated feature vector is already represented by the particular feature vector in the dictionary. The device generates a training dataset based on the training dataset dictionary for training a machine learning-based traffic flow analyzer.

Illustratively, the techniques described herein may be performed by hardware, software, and/or firmware, such as in accordance with the training dataset generator process 248, which may include computer executable instructions executed by the processor 220 (or independent processor of interfaces 210) to perform functions relating to the techniques described herein, e.g., in conjunction with traffic flow analyzer process 249.

Figure 4:
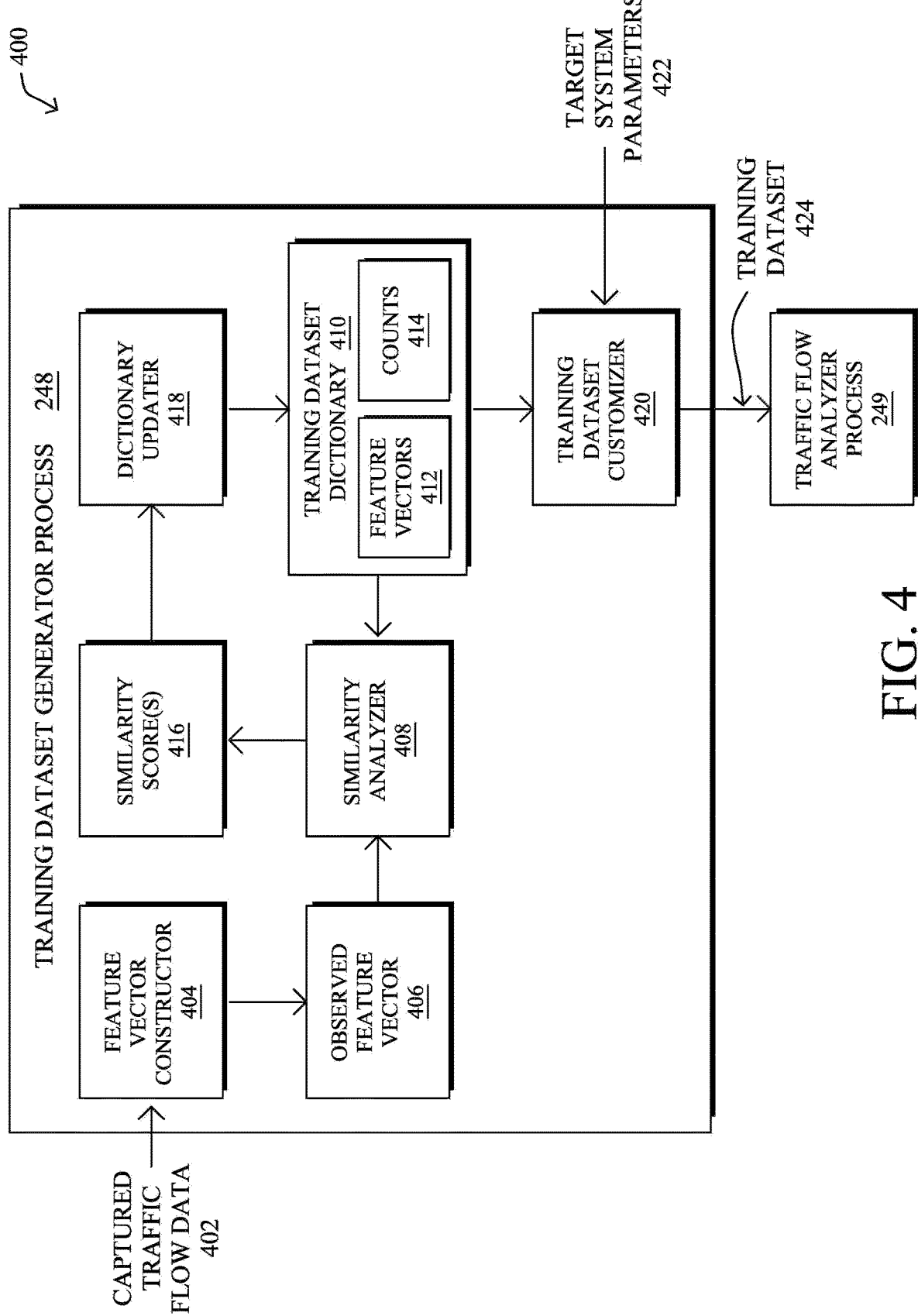
FIG. 4 illustrates an example architecture for generating a training dataset for a traffic flow analyzer.

Operationally, FIG. 4 illustrates an example architecture 400 for generating a training dataset for a traffic flow analyzer, according to various embodiments. As shown, training dataset generator process 248 may include any number of sub-processes and/or access any number of storage locations, to generate a training dataset 424 for use to train traffic flow analyzer process 249. As would be appreciated, the various elements of architecture 400 may be implemented on a single device (e.g., a single device 200) or, alternatively, in a distributed manner across multiple devices. For example, in some cases, the device executing training dataset generator process 248 may send training dataset 424 via a network to another device configured to train the machine learning model(s) of traffic flow analyzer process 249. Further, while specific sub-processes and memory locations are shown in architecture 400, their respective functionalities can be combined or incorporated into other elements, as desired.

Training dataset generator process 248 may receive as input captured traffic flow data 402. In some cases, the device executing training dataset generator process 248 may also operate to capture traffic flow data 402. In other cases, the device executing training dataset generator process 248 may receive traffic flow data 402 from one or more other capturing devices in the network. As noted previously, traffic flow data 402 may include any or all information available regarding the traffic flows present in the network. For example, traffic flow data 402 may indicate the source/destination addresses of a flow, the ports in use, the protocols in use, header information such as TLS information, statistics or other computed metrics (e.g., in terms of packet timing, packet sizes, etc.), payload information if available, or any other information available from the observation of traffic flows in the network. Traffic flow data 402 may also comprise labels for the various flows, if known, such as benign vs. malicious, an application type associated with a given flow, etc.

Training dataset generator process 248 may execute a feature vector constructor 404 configured to construct an observed feature vector 406 for a particular observed traffic flow based on the information in captured traffic flow data 402. In general, observed feature vector 406 may be an n-dimensional set of measurements/observations from traffic flow data 402 regarding a particular observed traffic flow. For example, one dimension of feature vector 406 may indicate whether or not the particular traffic flow uses TCP or UDP, another dimension of feature vector 406 may indicate the ciphersuite associated with the traffic flow, etc.

In various embodiments, training dataset generator process 248 may maintain a training dataset dictionary 410. In general, training dataset dictionary 410 comprises a set of one or more feature vectors 412 constructed from captured traffic flow data 402 (e.g., by feature vector constructor 404). In addition, in some embodiments, training dataset dictionary 410 may include counts 414 that are associated with the feature vectors 412 in dictionary 410. Thus, training dataset dictionary 410 may comprise not only the feature vectors that are representative of the observed traffic in the network, but also information regarding the volume of the traffic represented by the various feature vectors. Said differently, counts 414 may provide a measure of how often or frequently traffic represented by a given feature vector 412 was observed in the network.

To determine whether observed feature vector 406 is already represented by one or more of feature vectors 412 in training dataset dictionary 410, training dataset generator process 248 may execute a similarity analyzer 408. In some embodiments, similarity analyzer 408 may compute one or more similarity scores 416 that represent how similar observed feature vector 406 is to any of the feature vectors 412 in training dataset dictionary 410. For example, a similarity score 416 may be a standard squared exponential or other measurement of the similarity between observed feature vector 406 and one of the feature vectors 412 in training dataset dictionary 410.

In further embodiments, similarity analyzer 408 may compute any form of function value (e.g., similarity score, analyzed rule, etc.) to control whether observed feature vector 406 is added to training dataset dictionary 410. Such a function value may be computed in addition to, or in lieu of, similarity scores 416, which are shown for illustrative purposes only. For example, in further embodiments, similarity analyzer 408 may compute one or more function values based on one or more features of feature is vector 406. Doing so may allow training dataset generator process 248 to purposely add feature vector 406 to training dataset dictionary 410 when feature vector 406 has a predefined subset of desired features (e.g., a specific operating system, a specific crypto library, etc.). Conversely, such a function value may also be used to filter out feature vectors that do not have the desired characteristics for the training dataset.

In some embodiments, training dataset generator process 248 may also execute a dictionary updater 418 to update training dataset dictionary 410 based on observed feature vector 406 and its corresponding similarity score(s) 416 or other function values. For example, if any of similarity scores 416 for observed feature vector 406 are above a predefined threshold, dictionary updater 418 may determine that observed feature vector 406 is already represented in training dataset dictionary 410. Conversely, if the similarity scores 416 for observed feature vector 406 are below a defined threshold, dictionary updater 418 may determine that observed feature vector 406 is not represented in training dataset dictionary 410.

If dictionary updater 418 determines that observed feature vector 406 is already represented in training dataset dictionary 410, dictionary updater 418 may simply update the counts 414 for one or more of the feature vectors 412 that are deemed similar to observed feature vector 406. In some cases, dictionary updater 418 may increment the count 414 associated with the most similar feature vector 412 to observed feature vector 406 (e.g., the feature vector 412 with the highest similarity score 416). In other cases, dictionary updater 418 may increment the count 414 associated with each of the feature vectors 412 that have corresponding similarity scores 416 above the predefined similarity threshold or a subset thereof (e.g., the top two most similar, the top three most similar, etc.). In doing so, training dataset dictionary 410 not only maintains a reduced representation of all of the observed traffic flows, but also a measure of how often a particular feature vector 412 represented an observed traffic flow in the network.

If dictionary updater 418 determines that observed feature vector 406 is not already represented by any of feature vectors 412 in training dataset dictionary 410, dictionary updater 418 may add observed feature vector 406 to feature vectors 412. In addition, in some embodiments, dictionary updater 418 may also initialize a corresponding count 414 for added feature vector 406 (e.g., by setting the count to '1', etc.).

In various embodiments, training dataset generator process 248 may execute a training dataset customizer 420 configured to generate a training dataset 424 for training the machine learning model of traffic flow analyzer process 249. In general, given the network flow feature vectors and their prevalence from training dataset dictionary 410, training dataset customizer 420 can efficiently train a classifier or other machine learning mechanism by assigning weights to the feature vectors in training dataset 424 based on counts 414. In addition, if any labels are available in training dataset dictionary 410 (e.g., if feature vectors 412 are known to be benign or malicious, etc.), these labels may also be included in training dataset 424.

In some embodiments, training dataset customizer 420 may adjust the weights/counts of the feature vectors in training dataset 424 based on target system parameters 422, allowing for training dataset 424 to vary from the characteristics actually observed in captured traffic flow data 402. In some embodiments, parameters 422 may indicate the type of classifier or other machine learning mechanism to be trained for traffic flow analyzer process 249. Notably, some machine learning mechanisms, such as stochastic gradient descent (SGD) classifiers, can overfit to data samples that have high prevalence. In such cases, training dataset customizer 420 may enforce a maximum weight and/or count for any of the feature vectors 412 included in training dataset 424. For example, training a classifier on 10 million flows to google.com would not be productive for a simple perceptron model.

Target system parameters 422 may also indicate the types and/or volumes of traffic observed in the target network to which traffic flow analyzer 249 is to be deployed. In such cases, training dataset customizer 420 may adjust the weights/counts of the feature vectors 412 included in training dataset 424, accordingly. For example, assume that traffic flow analyzer process 249 is to be deployed to a network in which is traffic to facebook.com is blocked, but that certain feature vectors 412 in training dataset dictionary 410 relate to facebook.com traffic. In such a case, training dataset customizer 420 may treat these feature vectors as having a count and/or weight of zero, thereby effectively excluding these feature vectors 412 in training dataset dictionary 410 from the generated training dataset 424.

To test the efficacy of the techniques herein, traffic flow data for 1 million TLS encrypted flows from an enterprise network and 250,000 malicious TLS flows from Threat-GRID™ by Cisco Systems, Inc. were captured. Example data features that were collected included sequence of packet length and packet inter-arrival time (SPLT) information, byte distribution information, unencrypted TLS header information (e.g., offered ciphersuites, TLS extensions, etc.), and the like. The size of the compressed JavaScript Object Notation (JSON) for the resulting training dataset from this traffic flow data was 4.5 Gigabytes.

To determine flow similarity, a standard squared exponential with lambda=1.0 and a threshold of 0.99 was used. As a result, the filtered dataset included feature vectors for approximately 17,000 enterprise flows and approximately 11,000 malicious flows. The size of the compressed JSON for the resulting "filtered" training data was only 103 Megabytes, which is orders of magnitude smaller than that of the full set.

The filtered and unfiltered training datasets were then used to train a random forest classifier and a validation dataset comprising 100,000 malicious TLS flows and 1,000,000 enterprise TLS flows was used to compare the performance of the two classifiers. In terms of training time, it was noted that training the classifier using the unfiltered dataset was approximately 300 seconds compared to approximately 2 seconds for the filtered dataset. It is important to note that random forests are particularly efficient and this improvement in training times will be more pronounced for other machine learning processes, such as those that are kernel-based or based on backpropagation.

Total accuracy for the classifier trained using the unfiltered training dataset was observed to be 99.7% on the validation set and at a 1-in-10,000 false detection rate (FDR) was 89.3%. In contrast, total accuracy for the classifier trained using the filtered training dataset was observed to be 99.6% on the validation set, and the accuracy at a given 1-in-10,000 FDR was 91.3%, also an improvement over the unfiltered dataset. This is believed to be due to the original unfiltered dataset having TLS encrypted flows to content delivery networks (CDNs) that were also in the enterprise dataset. By combining these flows as part of the filtering, the resulting classifier was more robust to these outliers.

FIG. 5 illustrates an example simplified procedure for generating a training dataset for a traffic flow analyzer, in accordance with one or more embodiments described herein. For example, a non-generic, specifically configured device (e.g., device 200) may perform procedure 500 by executing stored instructions (e.g., process 248 and/or 249). The procedure 500 may start at step 505, and continues to step 510, where, as described in greater detail above, the device may generate a feature vector based on traffic flow data regarding one or more traffic flows in the network.

At step 515, as detailed above, the device may make a determination as to whether the generated feature vector is already represented in a training dataset dictionary by one or more feature vectors in the dictionary. In some embodiments, the device may compute one or more similarity scores between the generated feature vector and those in the dictionary. For example, the device may use a squared exponential function with a predefined threshold, to determine whether the generated feature vector is similar enough to a feature vector in the dictionary so as to be considered already represented.

At step 520, the device may update the training dataset dictionary based on the determination from step 515, as described in greater detail above. In some embodiments, if the feature vector generated in step 510 is not represented in the dictionary, the device may add the feature vector to the dictionary. In addition, the device may initialize a count for the added feature vector. However, in further embodiments, if the device determines that the feature vector is already represented by a particular feature vector in the dictionary, the device may simply increment a count associated with the particular feature vector in the dictionary.

At step 525, as detailed above, the device may generate a training dataset based on the training dataset dictionary for training a machine learning-based traffic flow analyzer. In some embodiments, the training dataset may include weightings for the included feature vectors from the dictionary that are based on their corresponding counts in the dictionary and/or one or more parameters for the target system. For example, the device may adjust the counts/weights for a particular traffic type based on the expected volume of traffic of that type in the target network (e.g., to exclude certain feature vectors from the training dataset if that type of traffic is not expected to exist, etc.). In further cases, the device may impose a maximum weighting based on the type of traffic flow analyzer, so as not to over-represent a given sample in the training dataset. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for various efficiency gains to be made in the learning phase of a traffic flow analyzer. In further aspects, the techniques herein allow for the adjustment of diversity metrics, such as by reducing sample weights for over-represented samples in epoch-based processes. Additionally, the techniques herein allow for less expensive storage and transmission of training datasets in terms of resource consumption. Further, with the data reduction techniques presented herein, this also allows for the possibility of deploying machine learning processes that require the training dataset to be present on-box, such as k-NN processes or dual-SVM processes on a router or other networking device.

While there have been shown and described illustrative embodiments that provide for the training of a traffic flow analyzer using a prototype training dataset, it is to be understood that various other adaptations and modifications may be made within the spirit and scope of the embodiments herein. For example, while certain embodiments are described herein with respect to using certain machine learning models, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

generating, by a device in a network, a feature vector based on traffic flow data regarding one or more traffic flows in the network;

making, by the device, a determination as to whether the feature vector is already represented in a training dataset dictionary by one or more feature vectors in the training dataset dictionary;

updating, by the device, the training dataset dictionary based on the determination as to whether the feature vector is already represented in the training dataset dictionary by one or more feature vectors in the training dataset dictionary, wherein updating the training dataset dictionary comprises one of:

adding the feature vector to the training dataset dictionary when the feature vector is not already represented by one or more feature vectors in the training dataset dictionary, or incrementing a count associated with a particular feature vector in the training dataset dictionary when the feature vector is already represented by the particular feature vector in the training dataset dictionary;

generating, by the device, a training dataset based on the training dataset dictionary;

training, by the device and based at least in part on the training dataset, a specific machine learning-based traffic flow classifier for deployment in a target network including:

dynamically adjusting, by the device, weights or counts of feature vectors of the training dataset based on overfitting metrics computed for a particular architecture and training configuration of the specific machine learning-based traffic flow classifier, excluding, by the device, a given feature vector in the training dataset based on a particular traffic type or an expected volume of traffic in the target network where the specific machine learning-based traffic flow classifier is to be deployed, and training, by the device, the specific machine learning-based traffic flow classifier with the training dataset using the weights or counts as dynamically adjusted to reduce redundancy, mitigate overfitting, accelerate convergence, and improve detection accuracy for deployment in the target network; and deploying, by the device, the specific machine learning-based traffic flow classifier in a computing device associated with the target network, causing the computing device to execute the specific machine learning-based traffic flow classifier to perform operations including:

automatically determine, based on packet-flow features extracted in real time, whether a given flow is benign or malicious.

2. The method as in claim 1, wherein the training dataset comprises a plurality of labels.

3. The method as in claim 1, wherein the traffic flow data comprises header information for one or more encrypted traffic flows.

4. The method as in claim 1, wherein adding the feature vector to the training dataset dictionary comprises:

initializing, by the device, a count associated with the feature vector.

5. The method as in claim 1, wherein making the determination as to whether the feature vector is already represented in the training dataset dictionary comprises:

computing, by the device, function values between the feature vector and feature vectors already in the training dataset dictionary.

6. The method as in claim 5, wherein the function values are computed using a squared exponential function.

7. The method as in claim 1, wherein generating the training dataset based on the training dataset dictionary comprises:

receiving, at the device, one or more parameters indicative of the particular traffic type and the expected volume of traffic of the particular traffic type in a target network;

identifying, by the device, one or more feature vectors in the training dataset dictionary that are associated with the particular traffic type; and determining, by the device, a representation of the one or more feature vectors in the training dataset based on the one or more parameters.

8. The method as in claim 1, wherein adjusting of the training dataset comprises:

determining that traffic of the particular traffic type is not expected to exist in the target network based on the expected volume of traffic of the particular traffic type in the target network; and excluding, in response to the determination, one or more feature vectors in the training dataset dictionary that are associated with the particular traffic type from the training dataset.

9. The method as in claim 7, wherein the particular traffic type comprises traffic associated with a particular domain.

10. An apparatus, comprising:

one or more network interfaces to communicate with a network;

a processor coupled to the one or more network interfaces and configured to execute one or more operations; and a memory configured to store a process that is executable by the processor, the process when executed operable to:

generate a feature vector based on traffic flow data regarding one or more traffic flows in the network;

make a determination as to whether the feature vector is already represented in a training dataset dictionary by one or more feature vectors in the training dataset dictionary;

update the training dataset dictionary based on the determination as to whether the feature vector is already represented in the training dataset dictionary by one or more feature vectors in the training dataset dictionary, wherein the apparatus updates the training dataset dictionary by one of:

adding the feature vector to the training dataset dictionary when the feature vector is not already represented by one or more feature vectors in the training dataset dictionary, or incrementing a count associated with a particular feature vector in the training dataset dictionary when the feature vector is already represented by the particular feature vector in the training dataset dictionary;

generate a training dataset based on the training dataset dictionary;

training based at least in part on the training dataset, a specific machine learning-based traffic flow classifier for deployment in a target network including:

dynamically adjusting weights or counts of feature vectors of the training dataset based on overfitting metrics computed for a particular architecture and training configuration of the specific machine learning-based traffic flow classifier, excluding a given feature vector in the training dataset based on a particular traffic type or an expected volume of traffic in the target network where the specific machine learning-based traffic flow classifier is to be deployed, and train the specific machine learning-based traffic flow classifier with the training dataset using the weights or counts as dynamically adjusted to reduce redundancy, mitigate overfitting, accelerate convergence, and improve detection accuracy for deployment in the target network; and deploying the specific machine learning-based traffic flow classifier in a computing device associated with the target network, causing the computing device to execute the specific machine learning-based traffic flow classifier to perform operations including:

automatically determine, based on packet-flow features extracted in real time, whether a given flow is benign or malicious.

11. The apparatus as in claim 10, wherein the traffic flow data comprises header information for one or more encrypted traffic flows.

12. The apparatus as in claim 10, wherein the apparatus adds the feature vector to the training dataset dictionary by:

initializing a count associated with the feature vector.

13. The apparatus as in claim 10, wherein the apparatus makes the determination as to whether the feature vector is already represented in the training dataset dictionary by:

computing function values between the feature vector and second feature vectors already in the training dataset dictionary.

14. The apparatus as in claim 13, wherein the function values are computed using a squared exponential function.

15. The apparatus as in claim 10, wherein the apparatus generates the training dataset based on the training dataset dictionary by:

receiving one or more parameters indicative of the particular traffic type and the expected volume of traffic of the particular traffic type in a target network;

identifying one or more feature vectors in the training dataset dictionary that are associated with the particular traffic type; and determining a representation of the one or more feature vectors in the training dataset based on the one or more parameters.

16. The apparatus as in claim 10, wherein the apparatus adjusts the training dataset by:

determining that traffic of the particular traffic type is not expected to exist in the target network based on the expected volume of traffic of the particular traffic type in the target network; and excluding, in response to the determination, one or more feature vectors in the training dataset dictionary that are associated with the particular traffic type from the training dataset.

17. The apparatus as in claim 16, wherein the particular traffic type comprises traffic associated with a particular domain.

18. A tangible, non-transitory, computer-readable medium that stores program instructions causing a device in a network to execute a process comprising:

generating, by the device, a feature vector based on traffic flow data regarding one or more traffic flows in the network;

making, by the device, a determination as to whether the feature vector is already represented in a training dataset dictionary by one or more feature vectors in the training dataset dictionary;

updating, by the device, the training dataset dictionary based on the determination as to whether the feature vector is already represented in the training dataset dictionary by one or more feature vectors in the training dataset dictionary, wherein updating the training dataset dictionary comprises one of:

adding the feature vector to the training dataset dictionary when the feature vector is not already represented by one or more feature vectors in the training dataset dictionary, or incrementing a count associated with a particular feature vector in the training dataset dictionary when the feature vector is already represented by the particular feature vector in the training dataset dictionary;

generating, by the device, a training dataset based on the training dataset dictionary;

training, by the device and based at least in part on the training dataset, a specific machine learning-based traffic flow classifier for deployment in a target network including:

dynamically adjusting, by the device, weights or counts of feature vectors of the training dataset based on overfitting metrics computed for a particular architecture and training configuration of the specific machine learning-based traffic flow classifier, excluding, by the device, a given feature vector in the training dataset based on a particular traffic type or an expected volume of traffic in the target network where the specific machine learning-based traffic flow classifier is to be deployed, and training, by the device, the specific machine learning-based traffic flow classifier with the training dataset using the weights or counts as dynamically adjusted to reduce redundancy, mitigate overfitting, accelerate convergence, and improve detection accuracy for deployment in the target network; and deploying, by the device, the specific machine learning-based traffic flow classifier in a computing device associated with the target network, causing the computing device to execute the specific machine learning-based traffic flow classifier to perform operations including:

automatically determine, based on packet-flow features extracted in real time, whether a given flow is benign or malicious.

19. The tangible, non-transitory, computer-readable medium as in claim 18, wherein making the determination as to whether the feature vector is already represented in the training dataset dictionary comprises:

computing, by the device, function values between the feature vector and feature vectors already in the training dataset dictionary.

20. The method as in claim 1, wherein deploying the specific machine learning-based traffic flow classifier in the computing device associated with the target network, causes the computing device to execute the specific machine learning-based traffic flow classifier to perform operations including:

monitoring, using a hardware component of the computing device, real-time traffic data flow routed by the computing device.

* * * * *